United States Patent
Tout et al.

(10) Patent No.: US 7,896,444 B2
(45) Date of Patent: Mar. 1, 2011

(54) CONVEYOR PAN WITH IMPROVED EDGE SHAPING

(75) Inventors: John Tout, Worcester (GB); Gordon Edmund Powell, Worcestershire (GB)

(73) Assignee: Joy MM Delaware, Inc., Wilmington, DE (US)

( * ) Notice: Subject to any disclaimer, the term of this patent is extended or adjusted under 35 U.S.C. 154(b) by 126 days.

(21) Appl. No.: 12/201,224

(22) Filed: Aug. 29, 2008

(65) Prior Publication Data
US 2009/0066147 A1 Mar. 12, 2009

(30) Foreign Application Priority Data
Sep. 11, 2007 (GB) .................................. 0717688.6

(51) Int. Cl.
*E21C 35/12* (2006.01)
(52) U.S. Cl. .......................................................... 299/43
(58) Field of Classification Search ............... 198/735.2, 198/860.2; 299/34.1, 42–45
See application file for complete search history.

(56) References Cited

U.S. PATENT DOCUMENTS

| | | | | |
|---|---|---|---|---|
| 4,474,411 A | * | 10/1984 | Peters et al. | 299/43 |
| 4,607,890 A | * | 8/1986 | Merten et al. | 299/43 |
| 4,733,771 A | * | 3/1988 | Grundken et al. | 198/735.6 |
| 5,184,873 A | * | 2/1993 | Fiesel | 299/43 |
| 5,605,220 A | * | 2/1997 | Krohm | 198/735.6 |
| 2004/0256907 A1 | * | 12/2004 | Merten et al. | 299/34.04 |

* cited by examiner

*Primary Examiner* — Sunil Singh
(74) *Attorney, Agent, or Firm* — Michael Best & Friedrich LLP

(57) ABSTRACT

A conveyor pan for use with a shearer with a skid-type shoe in a longwall mining operation, the conveyor pan including a side member having a surface adapted to be engaged by the shearer skid-type shoe, the surface being formed by a piece of the side member that extends horizontally for the length of the side member. The piece has a first end and a second end, each piece end having a top, a rear, a front and an edge. The first end edge and the second end edge are each formed by each edge being between 45 degrees removed from a vertical plane extending at 90 degrees to the horizontal plane formed by the side member surface.

14 Claims, 3 Drawing Sheets

CONVEYOR PAN WITH IMPROVED EDGE SHAPING

BACKGROUND OF THE INVENTION

This invention relates to a conveyor pan assembly for an armored face conveyor, such as for handling coal in a long-wall face mining system.

A variety of different apparatuses exist for mining coal and other materials from underground seams. One apparatus is a continuous mining machine used in instances where extended portions or longwalls of seam are mined. Such longwalls may, depending upon the seam configuration, extend for distances of 300-1200 or more feet. It is standard practice in this type of mining to mine parallel entries into the seam to be mined and connect those entries with one or more primary passages. Such arrangement defines the longwall faces to be mined. The roof of the primary passages are usually supported by movable roof supports during the mining of the exposed "face" of the longwall pillar.

Conventional longwall mining techniques employ a mining machine that is known in the industry as a longwall shearer. A longwall shearer typically has an elongated mobile frame that is supported on powered roof supports that are adjacent and substantially parallel to the mine face. Rotary driven toothed drums are operably supported on arms on each end of the elongated frame for winning the coal as the frame passes back and forth before the mine face. The won material falls into a face conveyor that is usually attached to the floor-mounted tracks and extends parallel to the longwall face. The face conveyor discharges the material onto other conveying apparatuses to transport the material from the seam. As the mine face recedes, the conveyor and track assembly is advanced forward to enable the shearer to continue mining.

Typically, the face conveyor includes a plurality of conveyor pans, and each conveyor pan includes a hardened steel deck plate secured to supporting cast steel side members or rails. The plurality of conveyor pans is assembled in end-to-end relationship to form a complete conveyor system for moving coal or other mineral along and away from the mine face under active excavation.

The pan assembly side members additionally support the haulage system for the shearer. A scraper chain extends along the entire conveyor system length with spaced flights serving to move the coal along the deck plate. The strength of the armored face mining conveyor and its structural integrity is of a primary concern. Eliminating structural failures in the conveyor system, and thus minimizing down time, is important to assure an efficient longwall mining operation.

The operating environment of a mine is extremely harsh on mechanical equipment of all forms. The very nature of the work objective is to cut and remove abrasive material. Moreover, the abrasive material is fluidized in the presence of water and contaminated oil. In the case of material removal conveyors, the abrasive aggregate is wiped along the conveyor pan surfaces to exacerbate the grinding destruction. In addition to the abrasive and corrosive nature of the environment, the machinery is subjected to extreme ranges of shock, mechanical twisting, racking and concentrated stresses due to uneven support surfaces.

The pan assembly side members of known conveyors have right angle ends with a single chamfer, or are formed to make a mating scarf joint.

SUMMARY OF THE INVENTION

One of the principal objects of the invention is to provide an improved longwall conveyor pan.

Another of the principal objects of the invention is to delay and smooth shearer load transfer from conveyor pan to conveyor pan.

The invention delays full shearer load some 100-150 mm away from the vulnerable conveyor pan ends.

Another of the principal objects of the invention is to increase shearer shoe track end strength by eliminating weak corners of the conveyor pan shearer track.

Another of the principal objects of the invention is to lower stress levels at extreme ends of a conveyor pan.

Another of the principal objects of the invention is to improve conveyor pan fatigue life.

Another of the principal objects of the invention is to protect the conveyor pan side section ends from overloading.

Another of the principal objects of the invention is to smooth shearer shoe transition from conveyor pan to conveyor pan.

Another of the principal objects of the invention is to reduce conveyor pan fines compaction conveyor pan to conveyor pan.

Another of the principal objects of the invention is to reduce problems caused by misalignment of adjacent conveyor pan section ends. Any change in perfect alignment is more readily accommodated by the conveyor pan section ends of this invention.

More particularly, this invention provides a conveyor pan for use with a shearer with a skid-type shoe in a longwall mining operation, the conveyor pan including a side member having a surface adapted to be engaged by the shearer skid-type shoe. The surface is formed by a piece of the side member that extends horizontally for the length of the side member, the piece having a first end and a second end. Each piece end has a top, a rear, a front and an edge. The first end edge and the second end edge each is formed by each edge being between 20 degrees to 60 degrees removed from a vertical plane extending at 90 degrees to the horizontal plane formed by the side member surface.

The invention also provides a longwall mining assembly including a shearer with a skid-type shoe, the skid-type shoe having a shoe length in its direction of travel, and a conveyor pan assembly including a plurality of adjacent conveyor pans as defined above. The top at the first end edge is double chamfered, with a first longer extending chamfer of between 5 and 10 degrees angle and with a second shorter extending chamfer at the piece edge of between 15 and 30 degrees angle, and the top at the second end edge is also double chamfered, with a first longer extending chamfer of between 5 and 10 degrees angle and with a second shorter extending chamfer at the piece edge of between 15 and 30 degrees angle. The first end edge and the second end edge form a "V" shaped opening, with the "V" shaped opening being open in the piece end front and closed in the piece end rear, the "V" opening being greater than a third of the length of the shoe.

Figure 1:
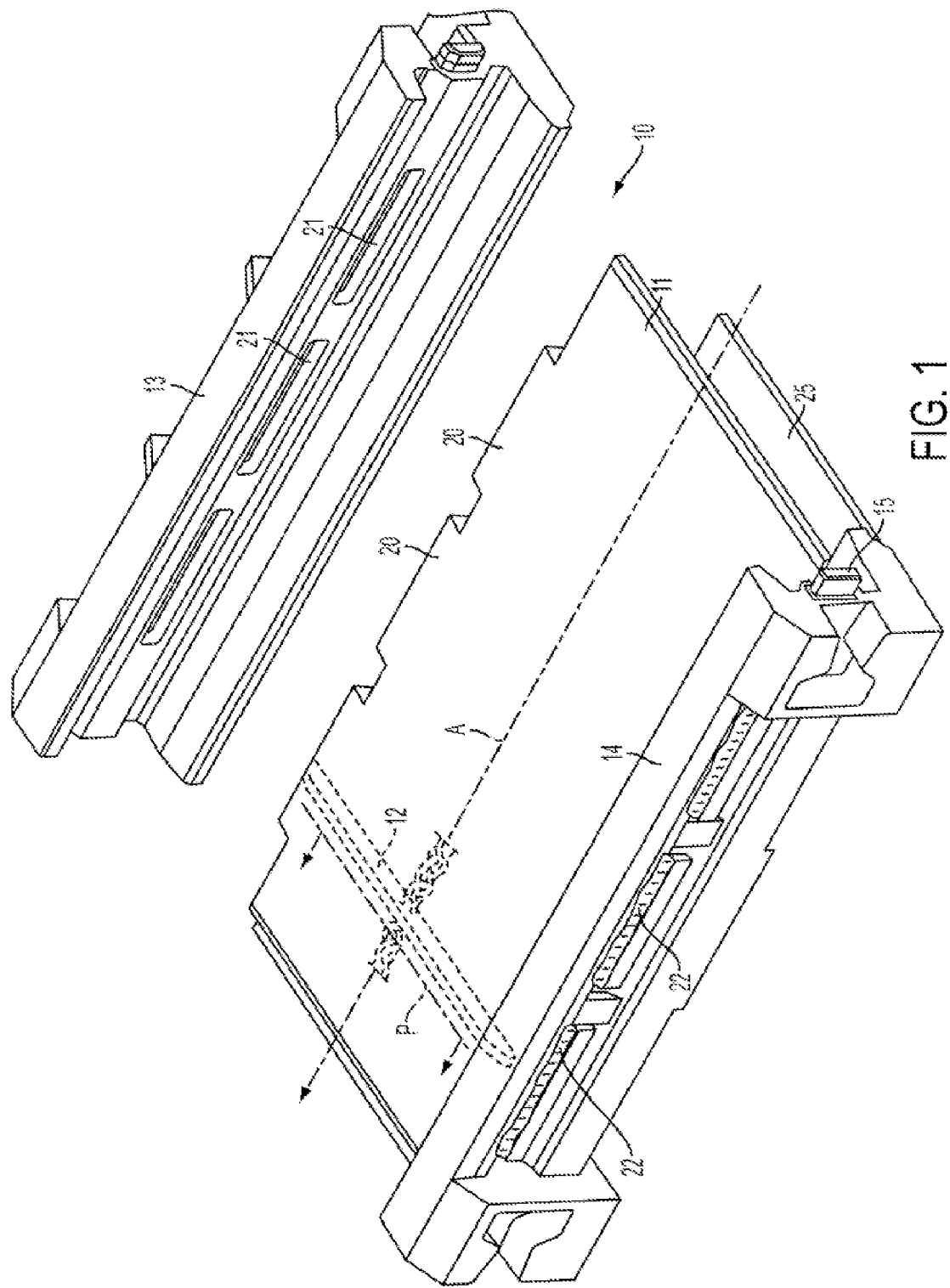
FIG. 1 is a perspective exploded schematic view of a conveyor pan in accordance with this invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience in reference to the drawings and are not to be construed as limiting terms.

DETAILED DESCRIPTION OF THE PREFERRED EMBODIMENT

As illustrated in FIG. 1 of the drawings, the invention includes a longwall mine face conveyor pan assembly 10 especially adapted for use with an armored face conveyor system for handling coal or the like. An elongated deck plate 11 serves to define the coal production feed path P along the longitudinal axis A of the conveyor system. As is conventional, the feeding of the coal along the conveyor pan assembly 10 is by a scraper chain with individual flights 12; one shown in dashed line outline in FIG. 1.

A pair of parallel side rails or members 13 and 14, preferably formed as sigma sections and extending along opposite sides of the deck plate 11, further define the material feed path P. The sigma section rail profile is a standard of the industry to provide concave guide walls for the scraper chain flights 12. The upper walls are in direct contact with the aggregate material scraped along by the upper chain flights whereas the lower concave walls guide and align the flight returns but do not transport mine aggregate. In other embodiments, however, other shapes could be used.

The deck plate 11 is connected to the side members 13, 14 in a conventional manner, such as by welding keys 20 received in mating slots 21 in the side members 13, 14. In other embodiments, other means for connecting the deck plate 11 to the side members 13, 14 can be used.

Figure 6:
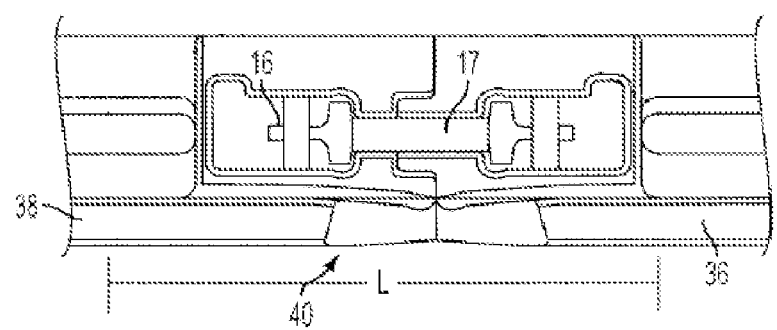
FIG. 6 is a side view of two adjacent side members of FIG. 3, with a shearer skid-type shoe shown in ghost on the side member shoe race.

Each conveyor pan assembly 10 is only one module of a series that is linked together by "dumb bells" type straps 17, as shown in FIG. 6. Alignment pins 15 (see FIG. 1) projecting from one end of each side members 13 and 14 penetrate corresponding sockets (not shown) on the opposite end of each side member. Strap pockets 16 receive the dumb bells 17 to keep adjacent pan assemblies within a required longitudinal proximity and maintain penetration proximity of the alignment pins 15 with corresponding sockets.

Figure 2:
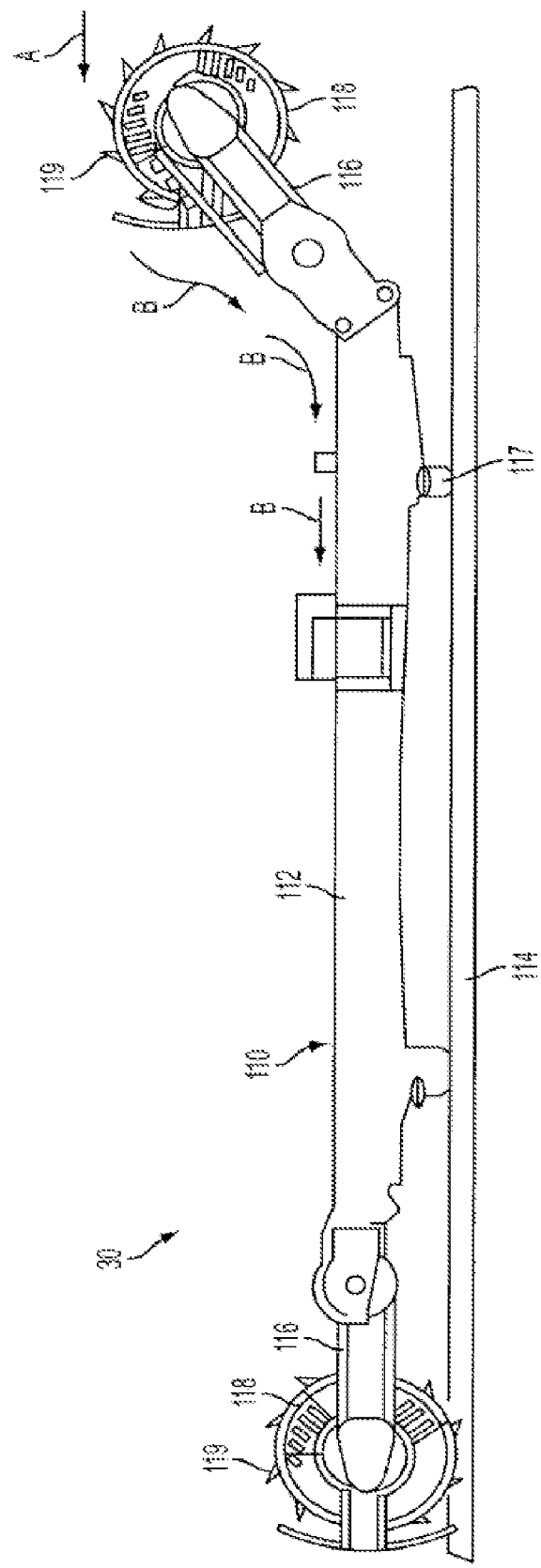
FIG. 2 is a schematic side elevational view of a longwall assembly including a shearer and conveyor assembly in accordance with this invention.
Figure 3:
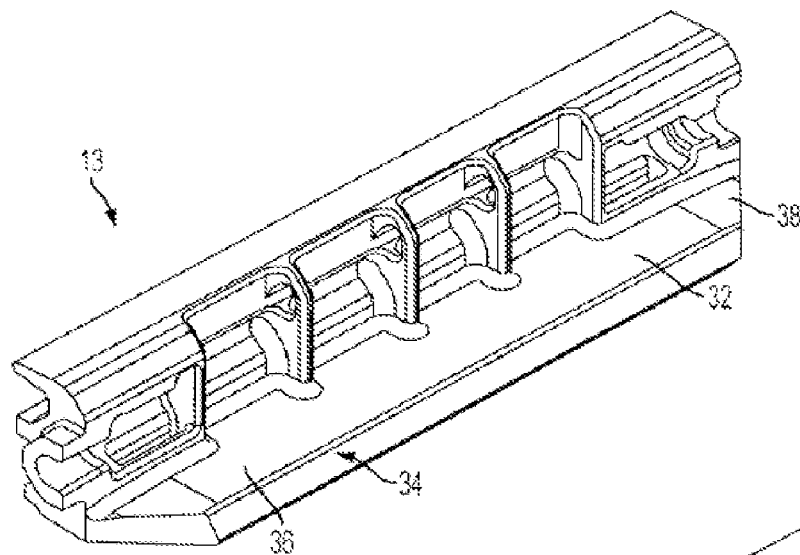
FIG. 3 is a more detailed perspective view of the rear most side member of the conveyor pan shown in FIG. 2.
Figure 4:
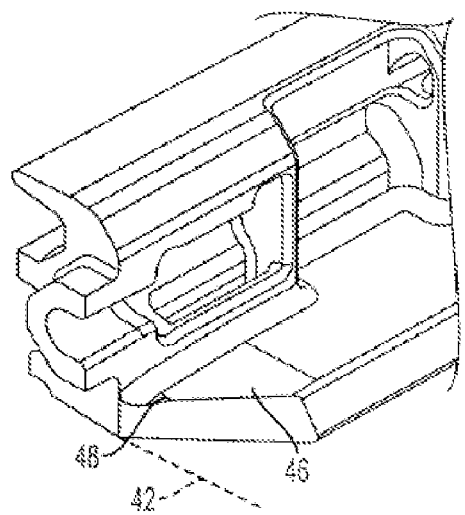
FIG. 4 is an enlarged view of the left end of the side member shown in FIG. 3.
Figure 5:
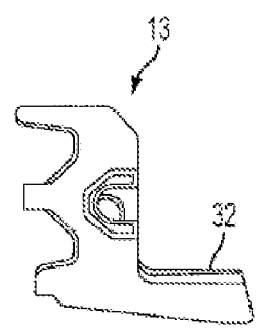
FIG. 5 is an end view of the side member shown in FIG. 3.

A longwall shearer mining machine 110 is shown in FIG. 2. More particularly, the shearer 110 has an elongated mobile frame 112 with a skid-type shoe 117 that is movably supported on a race 114 that is substantially parallel with the longwall face. A laterally extending rotary drum 118 which has a plurality of mining bits 119 attached thereto is pivotally attached to each end of the elongated mobile frame 112 by a corresponding boom member 116. The operation of the shearer 110 is well known in the mining art and, as such, will not be discussed in detail herein. However, the skilled artisan will appreciate that the shearer 110 is moved back and forth on the race 114 such that the mining bits 119 on the rotating drums 118 can be brought into engagement with the mine face to dislodge material there from. As the face recedes, the race 114 and shearer 110 are advanced towards the face to enable the mining process to be continued. The operating personnel are typically located at one end of the shearer 110.

More particularly, FIGS. 1 through 6 illustrate a longwall mining assembly 30 including the conveyor pan assembly 10 and the shearer 110 with the skid-type shoe 117, the skid-type shoe 117 having a shoe length L in its direction of travel (see FIG. 6). The conveyor pan assembly 10 includes a plurality of adjacent conveyor pans, with each conveyor pan including a side member 13 having a surface 32 (see FIG. 3) adapted to be engaged by the shearer skid-type shoe 117. The side member surface 32 is positioned so that the surfaces of the adjacent line pans form the planar race or shoe track 114 upon which the shearer shoe 117 can travel.

More particularly, as shown in FIGS. 3-6, the surface 32 is formed by a planar flange or piece 34 of the side member 13 that extends horizontally from the vertical guide wall for the entire length of the side member 13, each planar piece 34 having a first end 36 and a second end 38, with the first end 36 of one side member piece being adjacent the second end 38 of another side member piece, as shown in FIG. 6. Further, each piece end has a top, a rear at the guide wall, a front and an edge extending from the rear at the vertical guide wall to the front. The first end edge is adjacent the second end edge and forms between them a race junction between two adjacent conveyor pans.

Still more particularly, the first end edge and the second end edge forms a "V" shaped opening 40, with the "V" shaped opening being open in the piece end front and closed in the piece end rear, the "V" shape being formed by each edge being between 20 degrees to 60 degrees removed from a vertical plane extending at 90 degrees to the horizontal plane formed by the race. Even more particularly, in a preferred embodiment, the "V" shape is formed by each edge being 45 degrees removed from the vertical plane 42 (see FIG. 4) extending at 90 degrees to the horizontal plane formed by the surface 32 and at 90 degrees to the guide wall and the longitudinal axis A of the conveyor system. The front of the "V" opening is greater than a third of the length L of the shoe 117.

Further, the top at the first edge is double chamfered (see FIG. 4), with a first longer extending chamfer 46 of between 5 and 10 degrees relative to horizontal and with a second shorter extending chamfer 48 at the piece edge of between 15 and 30 degrees relative to horizontal. The top at the second edge is also double chamfered, with a first longer extending chamfer of between 5 and 10 degrees relative to horizontal and a second shorter extending chamfer at the piece edge of between 15 and 30 degrees relative to horizontal. In a preferred embodiment of the invention, the first longer extending chamfer 46 at each piece edge is at a 7.5 degrees angle relative to horizontal and the second shorter extending chamfer 48 at each piece edge is at a 20 degrees angle relative to horizontal.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

Various other features and advantages of the invention will be apparent from the following claims.

The invention claimed is:

1. A conveyor pan assembly for use with a shearer with a skid-type shoe in a longwall mining operation, said conveyor pan assembly including:

a plurality of adjacent conveyor pans, each conveyor pan including a side member having a surface adapted to be engaged by the shearer skid-type shoe, said side member surface being positioned so that the surfaces of the adjacent conveyor pans form a race upon which the shearer shoe can travel, said side member surface being formed by a piece of said side member that extends horizontally from a vertical guide wall for the entire length of the side member, each piece having a first end and a second end, with the first end of one side member piece being adjacent the second end of another side member piece, each piece end having a top, a rear at the vertical guide wall, a front and an edge extending from said rear at the vertical guide wall to said front, with the first end edge being adjacent the second end edge and forming between them a race junction between two adjacent conveyor pans, said first end edge and said second end edge forming a "V" shaped opening, with the "V" shaped opening being open in the piece end front and closed in the piece end rear, the "V" shape being formed by each edge being between 20 degrees to 60 degrees removed from a vertical plane extending at 90 degrees to the horizontal plane formed by the race and at 90 degrees to the vertical guide wall.

2. A conveyor pan assembly in accordance with claim 1, wherein the top at the first end edge is double chamfered, with a first longer extending chamfer of between 5 and 10 degrees relative to horizontal and with a second shorter extending chamfer at the piece edge of between 15 and 30 degrees relative to horizontal, and the top at the second end edge being double chamfered, with a first longer extending chamfer of between 5 and 10 degrees relative to horizontal and with a second shorter extending chamfer at the piece edge of between 15 and 30 degrees relative to horizontal.

3. A conveyor pan assembly in accordance with claim 2, wherein the top at the first and second end edges first longer extending chamfer is at a 7.5 degrees angle relative to horizontal.

4. A conveyor pan assembly in accordance with claim 2, wherein the top at the first and second end edges second shorter extending chamfer at the piece edge is at a 20 degrees angle relative to horizontal.

5. A conveyor pan assembly in accordance with claim 1, wherein said first end edge and said second end edge being between 45 degrees removed from a vertical plane extending at 90 degrees to the horizontal plane formed by the race.

6. A conveyor pan for use with a shearer with a skid-type shoe in a longwall mining operation, said conveyor pan including a side member having a surface adapted to be engaged by the shearer skid-type shoe, said side member surface being formed by a piece of said side member that extends horizontally from a vertical guide wall for the length of the side member, said piece having a first end and a second end, each piece end having a top, a rear at the vertical guide wall, a front and an edge extending from said rear at the vertical guide wall to said front, said first end edge and said second end edge each being formed by each edge being between 20 degrees to 60 degrees removed from a vertical plane extending at 90 degrees to the horizontal plane formed by the side member surface and at 90 degrees to the vertical guide wall.

7. A conveyor pan assembly in accordance with claim 6, wherein the top at the first end edge is double chamfered, with a first longer extending chamfer of between 5 and 10 degrees relative to horizontal and with a second shorter extending chamfer at the piece edge of between 15 and 30 degrees relative to horizontal, and the top at the second end edge being double chamfered, with a first longer extending chamfer of between 5 and 10 degrees relative to horizontal and with a second shorter extending chamfer at the piece edge of between 15 and 30 degrees relative to horizontal.

8. A conveyor pan assembly in accordance with claim 7, wherein the top at the first and second end edges first longer extending chamfer is at a 7.5 degrees angle relative to horizontal.

9. A conveyor pan assembly in accordance with claim 7, wherein the top at the first and second end edges second shorter extending chamfer at the piece edge is at a 20 degrees angle relative to horizontal.

10. A conveyor pan assembly in accordance with claim 6, wherein said first end edge and said second end edge being between 45 degrees removed from a vertical plane extending at 90 degrees to the horizontal plane formed by the race.

11. A longwall mining assembly including a shearer with a skid-type shoe, said skid-type shoe having a shoe length in its direction of travel, and a conveyor pan assembly including:

a plurality of adjacent conveyor pans, each conveyor pan including a side member having a surface adapted to be engaged by the shearer skid-type shoe, said side member surface being positioned so that the surfaces of the adjacent conveyor pans form a race upon which the shearer shoe can travel, said side member surface being formed by a piece of said side member that extends horizontally from a vertical guide wall for the length of the side member, each piece having a first end and a second end, with the first end of one side member piece being adjacent the second end of another side member piece, each piece end having a top, a rear at the vertical guide wall, a front and an edge, with the first end edge being adjacent the second end edge and forming between them a race junction between two adjacent conveyor pans, said first end edge and said second end edge forming a "V" shaped opening, with the "V" shaped opening being open in the piece end front and closed in the piece end rear, the "V" shape being formed by each edge being between 20 degrees to 60 degrees removed from a vertical plane extending at 90 degrees to the horizontal plane formed by the race and at 90 degrees to the vertical guide wall, with the top at the first end edge being double chamfered, with a first longer extending chamfer of between 5 and 10 degrees relative to horizontal and with a second shorter extending chamfer at the piece edge of between 15 and 30 degrees relative to horizontal, and the top at the second end edge being double chamfered, with a first longer extending chamfer of between 5 and 10 degrees relative to horizontal and with a second shorter extending chamfer at the piece edge of between 15 and 30 degrees relative to horizontal, the "V" opening being greater than a third of the length of the shoe.

12. A conveyor pan assembly in accordance with claim 11, wherein the top at the first and second end edges first longer extending chamfer is at a 7.5 degrees angle.

13. A conveyor pan assembly in accordance with claim 11, wherein the top at the first and second end edges second shorter extending chamfer at the piece edge is at a 20 degree angle.

14. A conveyor pan assembly in accordance with claim 11, wherein said first end edge and said second end edge being between 45 degrees removed from a vertical plane extending at 90 degrees to the horizontal plane formed by the race.

* * * * *

UNITED STATES PATENT AND TRADEMARK OFFICE
CERTIFICATE OF CORRECTION

| | |
|---|---|
| PATENT NO. | : 7,896,444 B2 |
| APPLICATION NO. | : 12/201224 |
| DATED | : March 1, 2011 |
| INVENTOR(S) | : John Tout and Gordon Edmund Powell |

Page 1 of 1

It is certified that error appears in the above-identified patent and that said Letters Patent is hereby corrected as shown below:

In the Claims,

Column 5, Line 59, delete "assembly";

Column 6, Line 4, delete "assembly";

Column 6, Line 8, delete "assembly";

Column 6, Line 12, delete "assembly";

Column 6, Line 52, delete "conveyor pan" and replace with --longwall mining--;

Column 6, Line 55, delete "conveyor pan" and replace with --longwall mining--;

Column 6, Line 59, delete "conveyor pan" and replace with --longwall mining--.

Signed and Sealed this
Fifteenth Day of October, 2013

Teresa Stanek Rea
*Deputy Director of the United States Patent and Trademark Office*